(12) United States Patent
Eger et al.

(10) Patent No.: US 9,783,068 B2
(45) Date of Patent: Oct. 10, 2017

(54) METHOD AND APPARATUS FOR PROVIDING ELECTRICAL ENERGY

(75) Inventors: Kolja Eger, Ottobrunn (DE);
Alexander Kepka, Nuremberg (DE);
Andreas Zwirlein, Munich (DE);
Georg Von Wichert, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 269 days.

(21) Appl. No.: 14/239,590

(22) PCT Filed: Aug. 19, 2011

(86) PCT No.: PCT/EP2011/064294
§ 371 (c)(1),
(2), (4) Date: Feb. 19, 2014

(87) PCT Pub. No.: WO2013/026464
PCT Pub. Date: Feb. 28, 2013

(65) Prior Publication Data
US 2014/0225565 A1    Aug. 14, 2014

(51) Int. Cl.
*H02J 7/00* (2006.01)
*B60L 11/18* (2006.01)
(Continued)

(52) U.S. Cl.
CPC ....... *B60L 11/1809* (2013.01); *B60L 11/1844* (2013.01); *H02J 3/14* (2013.01);
(Continued)

(58) Field of Classification Search
CPC . B60L 11/1809; B60L 11/1844; H02J 7/0013; H02J 13/0006; H02J 3/14;
(Continued)

(56) References Cited

U.S. PATENT DOCUMENTS 5,367,242 A * 11/1994 Hulman ............... G08B 3/1075
320/108
5,963,457 A * 10/1999 Kanoi ...................... H02J 3/00
340/870.03
(Continued)

FOREIGN PATENT DOCUMENTS

CN          1459391 A1   12/2003
CN        102009625 A     4/2011
(Continued)

OTHER PUBLICATIONS

D. Bertsekas, R. Gallager: "Data Networks", 2nd Edition, Prentice-Hall, 1992, pp. 527, 528.

*Primary Examiner* — Jack Chiang
*Assistant Examiner* — Brandon Bowers
(74) *Attorney, Agent, or Firm* — Laurence Greenberg; Werner Stemer; Ralph Locher

(57) ABSTRACT

Electrical energy is made available incrementally for at least one session (for example for charging an electric vehicle), i.e. to prevent, by way of the delayed provision of the electrical energy, the occurrence of brief severe loading of the energy network. For example, a newly determined load distribution can lead to redistribution of electrical energy for a large number of charging stations, and this redistribution is preferably not carried out at once at a single time for all the affected charging stations but instead is carried out distributed, for example, over multiple points in time. This is advantageous and useful in electric mobility and in load management when charging multiple electric vehicles.

19 Claims, 5 Drawing Sheets

(51) Int. Cl.
*H02J 7/02* (2016.01)
*H02J 3/14* (2006.01)
*H02J 13/00* (2006.01)

(52) U.S. Cl.
CPC .............. *H02J 7/0013* (2013.01); *H02J 7/02* (2013.01); *H02J 13/0006* (2013.01); *H02J 13/0062* (2013.01); *H02J 13/0075* (2013.01); *Y02E 60/721* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(58) Field of Classification Search
CPC ...... H02J 7/02; H02J 13/0075; H02J 13/0062; Y02T 10/7072; Y02T 90/168; Y02T 90/121; Y02T 10/7055; Y02T 90/128; Y04S 30/12

USPC ........................................................ 320/109
See application file for complete search history.

(56) References Cited

U.S. PATENT DOCUMENTS

| | | | |
|---|---|---|---|
| 6,225,776 B1* | 5/2001 | Chai | B60L 3/0069 320/109 |
| 2010/0106631 A1* | 4/2010 | Kurayama | B60L 11/1816 705/34 |
| 2010/0207588 A1 | 8/2010 | Lowenthal et al. | |
| 2012/0146583 A1 | 6/2012 | Gaul et al. | |
| 2013/0046411 A1* | 2/2013 | Al Faruque | H02J 3/32 700/286 |
| 2013/0069592 A1 | 3/2013 | Bouman | |

FOREIGN PATENT DOCUMENTS

| | | |
|---|---|---|
| CN | 2797507 A1 | 5/2011 |
| DE | 102009036816 A1 | 2/2011 |

* cited by examiner

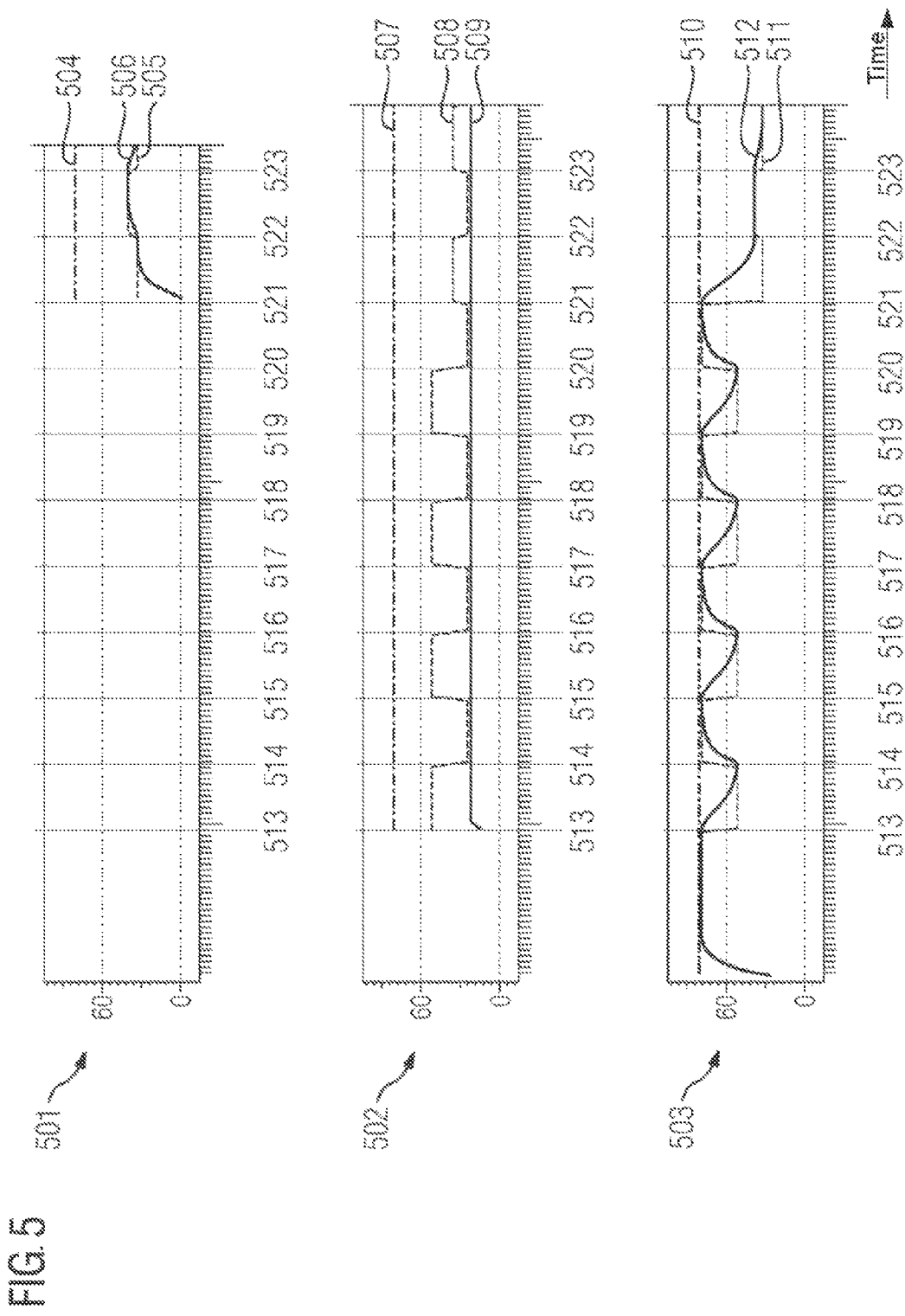

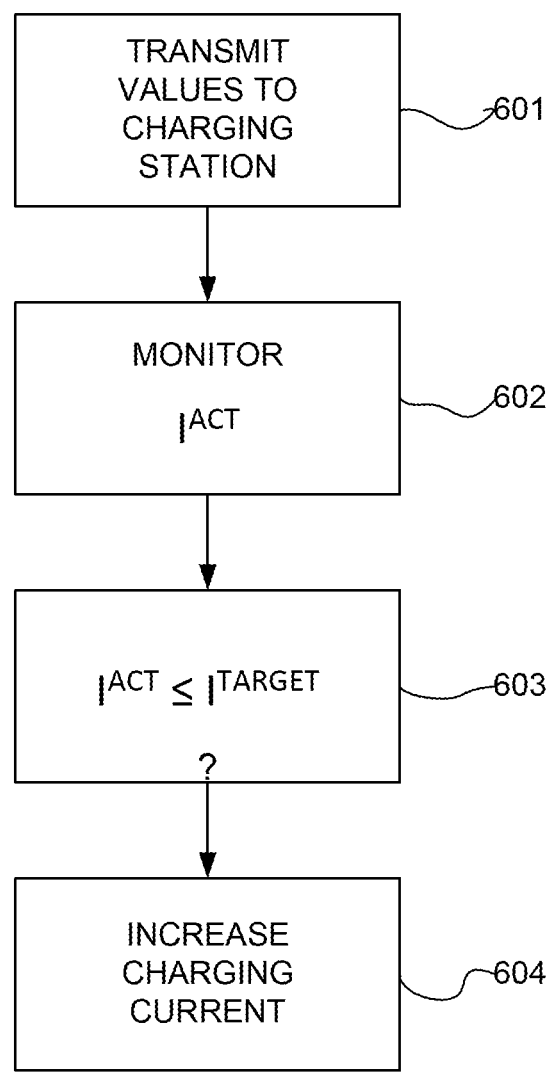

METHOD AND APPARATUS FOR PROVIDING ELECTRICAL ENERGY

BACKGROUND OF THE INVENTION

Field of the Invention

The invention relates to a method and an apparatus for providing electrical energy, in particular relating to the sector of electromobility or charging of electrical vehicles.

For electromobility, an infrastructure is required which enables charging of electric vehicles from an electric grid. The electric vehicles are preferably connected to and charged via charging stations (for example publicly accessible electric service stations). Furthermore, there are additional components or functions for the authentication, billing and/or monitoring of the charging operations.

In this case, it is problematic to distribute the available electrical energy or the charging current and the grid capacities efficiently and fairly in the case of a large number of charging operations which are initiated at different points in time.

BRIEF SUMMARY OF THE INVENTION

The object of the invention consists in specifying an efficient approach which is favorable for the supply grid for charging electric vehicles.

This object is achieved in accordance with the features of the independent claims. Preferred embodiments are given in particular in the dependent claims.

In order to achieve the object, a method for providing electrical energy is specified in which a load distribution for at least one session is set by a stepwise allocation of the electrical energy. The stepwise allocation of the electrical energy can be a stepwise, for example temporally graduated, assignment of the electrical energy to the at least one session. It is also possible for the stepwise allocation to take place (quasi-)continuously by virtue of the electrical energy being adapted gradually over the course of time.

With the stepwise allocation of the electrical energy, it is advantageous that a peak load which could be caused by a new or changed load distribution is effectively avoided.

For example, the respective load current is communicated to a plurality of sessions at least partially at different points in time.

The session is, for example, a charging operation for an electric vehicle. In this case, a large number of sessions can be managed by, for example, a centralized unit, for example a charge management system. The electrical energy provided can comprise, for example, a charging current for the respective session.

The observation is made here that the term energy in particular comprises or relates to: a current, a voltage, a power and/or an energy in a more narrow sense.

An alternative embodiment consists in that the load distribution for a plurality of sessions is set stepwise by virtue of the electrical energies for the plurality of sessions being set successively.

Another configuration consists in that the stepwise allocation of the electrical energy comprises a plurality of steps, with there being a predetermined time period between said steps.

In particular, there may be a wait period between the individual steps until a session has set and/or receives a predetermined (for example lower) electrical energy.

Another configuration consists in that the electrical energy is further reduced or disconnected if, once the predetermined time period has elapsed, the allocated electrical energy has not been set.

A development consists in that the predetermined time period is constant or variable.

In particular, the plurality of steps can be separated from one another approximately by identical time periods or by different time periods.

An additional configuration consists in that the load distribution for a plurality of sessions is set by virtue of
- the sessions for which the electrical energy is intended to be reduced are set;
- the sessions for which the electrical energy is intended to be increased are set.

For example, in a first step only those charging stations for which the new charging current is intended to be reduced in comparison with the previous charging current are set. In a second step, those charging stations for which the charging current is intended to be increased in comparison with the previous charging current can then be set. Preferably, a check is first made (for example a measurement performed) to ascertain whether the reduced charging current has been successfully set or reached.

Another configuration consists in that the sessions with the increased electrical energy are set if electrical energy drawn at that time is less than or equal to a setpoint value for the electrical energy.

A development consists in that at least a proportion of an electrical energy provided for a session, which proportion has not been called up, is provided to at least one other session.

This solution has the advantage that resources which become free or are not claimed can be assigned to other sessions. Therefore, a consumer or a charging station does not necessarily block the entire energy provided, but the excess of energy not called up can be allocated to at least one further session. This also has the advantage that correction of the energies provided is possible and therefore, for example, initial planning of the electrical energies which are reserved for the individual sessions needs to be less accurate as a result of the possibility for correction. In other words, the initial allocation of the resources can have a greater degree of error, which can be corrected subsequently, for example during the actually implemented charging operations.

One advantage consists in that a predetermined (energy or load) profile which has been generated or agreed (for example purchased), for example, is adhered to and/or used efficiently.

In this case, mention will also be made of the fact that the communication between the electric vehicle and the charging infrastructure can be unidirectional or bidirectional. For example, the electric vehicle can explicitly communicate its required energy or desired power consumption to the charging infrastructure. It is also possible to determine from the response of the electric vehicle or a charging station what electrical energy is provided to the electric vehicle. In particular, one option consists in a charging current being negotiated between the electric vehicle and the charging infrastructure.

One development consists in that electrical energy which has not been called up by the session being provided completely or substantially completely to the at least one other session.

Another development consists in that a proportion of the electrical energy which has not been called up by the session is provided to the at least one other session.

In this case, the quantity of electrical energy which is provided to the at least one other session can be reduced by a predetermined amount. This makes it possible for the session to demand and also to receive an increased amount of electrical energy up to this amount for a short period of time (safety margin).

In particular, a development consists in that the electrical energy provided to the session is dependent on a type of session.

For example, it is possible to predetermine by the type of session that it is a session which is using a Schuco plug (grounding pin plug) and is only intended to be supplied with a constant electrical energy. Optionally, depending on the type of session, the electrical energy provided can be set to be constant or virtually constant or variable.

A further development consists in that at least the proportion of the electrical energy provided for this session which has not been called up is provided to the at least one other session if at least the proportion of the electrical energy not called up reaches or exceeds a predetermined threshold value.

In addition, a development consists in that at least the proportion of the electrical energy provided for the session which has not been called up is provided to the at least one other session if a maximum of the proportion of the electrical energy not called up and intended for different times reaches or exceeds the predetermined threshold value.

This prevents small quantities of electrical energy which become free giving cause for redistribution and thus prevents a large number of inefficient redistributions of small quantities of electrical energy.

In the context of an additional development, at least the proportion of the electrical energy provided for the session which has not been called up is provided to the at least one other session for a predetermined time period.

A further development consists in that
once the predetermined time period has elapsed, the electrical energy which is required by the session is determined;
if the electrical energy provided to the session is not called up, at least a proportion of the provided electrical energy is provided to the at least one other session.

To this extent, a predetermined time period can be determined whereby, once this time period has elapsed, renewed allocation of the electrical energy takes place.

A further possibility consists in that the provided electrical energy is a charging current for an electrical consumer or a power consumption of the electrical consumer.

A further configuration also consists in that the electrical consumer is an electric vehicle.

In addition, a development consists in that the session comprises a charging operation for an electric vehicle.

The approach described here may be a hardware component and/or a software functionality. In particular, a load management system for a charging system is proposed comprising, for example, a plurality of charging stations which are part of a publically accessible electrical service station, for example. A load management determines a load distribution whilst adhering to various conditions which can be both economical and technical (in relation to the grid) in nature. For example, grid bottlenecks can thus be avoided and at the same time it is possible to ensure that, for example, a charging operation is performed efficiently and in a manner which is favorable for the grid.

The abovementioned object is also achieved by an apparatus for providing electrical energy comprising a processing unit, which is set up in such a way that
a load distribution can be set for at least one session by a stepwise allocation of the electrical energy.

One configuration consists in that the processing unit is set up in such a way that at least a proportion of an electrical energy provided for a session which has not been called up can be provided to at least one other session.

One option consists in that the apparatus is arranged at least partially in a charging station of an electric vehicle.

The processing unit mentioned here can be embodied in particular as a processor unit and/or an at least partially hard-wired or logic circuit arrangement which is set up, for example, in such a way that the method can be implemented as described herein. Said processing unit can be or comprise any type of processor or computer with a correspondingly required peripheral (memory, input/output interfaces, input/output devices, etc.).

The above explanations relating to the method apply correspondingly to the apparatus. The apparatus can be embodied in one component or distributed in a plurality of components.

The solution proposed here further comprises a computer program product which can be loaded directly into a memory of a digital computer, comprising program code parts which are suitable for implementing the steps of the method described here.

Furthermore, the abovementioned problem is solved by means of a computer-readable storage medium, for example any desired memory, comprising instructions which can be implemented by a computer (for example in the form of program code) and which are suitable for the computer to implement the steps of the method described here.

The above described properties, features and advantages of this invention and the way in which these are achieved will become clearer and more easily understandable in connection with the following schematic description of exemplary embodiments which will be explained in more detail in connection with the drawings. For reasons of clarity, identical or functionally identical elements can be provided with the same reference symbols.

BRIEF DESCRIPTION OF THE SEVERAL VIEWS OF THE DRAWING

FIG. 5 shows a graph showing the time sequences of different charging operations for three electric vehicles;

FIG. 6 shows a schematic illustration showing change management for the load management.

DESCRIPTION OF THE INVENTION

Figure 4:
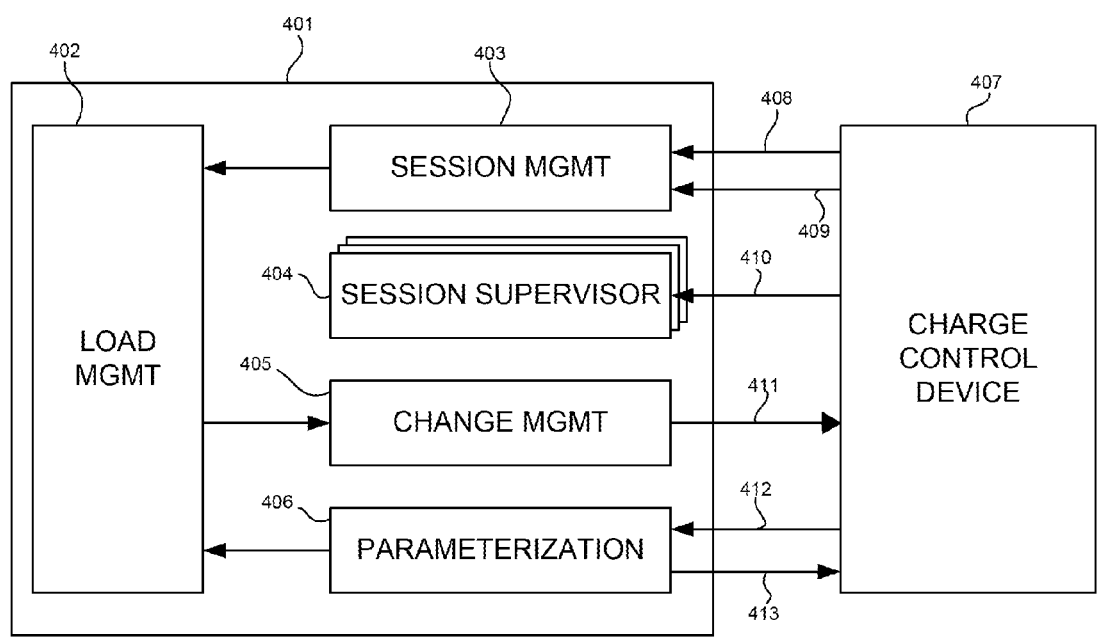
FIG. 4 shows a schematic illustration of an exemplary architecture for a load management in conjunction with a (for example central) charge control device for electric vehicles.

FIG. 4 shows a schematic illustration of an exemplary architecture for a load management 401 in conjunction with a (for example central) charge control device 407 for electric vehicles. The charge control device 407 communicates, for example, with at least one charging station (not illustrated in FIG. 4), wherein at least one electrical consumer having an energy store, for example an electric vehicle, can be connected to each charging station.

The load management 401 comprises a load management method 402, a session management 403, a change management 405 for the load management, a session supervisor 404 (preferably for each session) and a parameterization 406. A session preferably denotes a (charging) operation of an electric vehicle which is connected to the mentioned charging station, for example.

The load management method 402, the session management 403, the change management 405, the session supervisor 404 and the parameterization 406 are each a (functional) component of the load management 401, which can be implemented, if appropriate, using software and/or hardware on one appliance or a plurality of appliances. For reasons of simplicity, reference is made in the text which follows to the individual functional components 403 to 406 with the proposed nomenclature without reference being made in each case to the fact that it can be a function or a functional component. In addition, reference is made to the fact that the functional separation shown in FIG. 4 is used for clarity of the illustration; a specific implementation can combine a plurality of these functional blocks. It is thus a possibility for the components 402 to 406 to represent functions of the load management 401, wherein the load management 401 can be implemented on at least one physical component.

The following messages are communicated, for example, between the load management 401 and the charge control device 407:

- an energy demand 408 from the charge control device 407 to the session management 403;
- a session end communication 409 from the charge control device 407 to the session management 403;
- a session update message 410 from the charge control device 407 to the session supervisor 404;
- an energy setting communication 411 from the change management 405 to the charge control device 407, in which the electrical energy per session is specified;
- a message 412 for setting load management parameters, wherein the message 412 is transmitted from the charge control device 407 to the parameterization 406;
- a message 413 for updating the load management parameters, wherein the message 413 is transmitted from the parameterization 406 to the charge control device 407.

Session Management

The session management 403 manages the active sessions with their respective present state. The present state of a session is determined by the session supervisor 404.

The session management 403 receives the energy demand 408 and the session end communication 409 from the charge control device 407 and, on the basis thereof, initiates a (re-)calculation of the load distribution in the load management method 402.

Depending on a present state of the session, the session management 403 makes a decision on the setting of the charging current for this session. For example, it may be agreed that a session which is being charged via a plug of the type "Schuko plug" should only receive a constant charging current. To this extent, the session management 403 also allocates a constant charging current to such a session.

Session Supervisor

Each session is monitored, for example, by an instance of a session supervisor 404 and receives a present status from the charge control device 407 on the basis of the session update message 410.

Preferably, resources which are unused, for example have become free or are becoming free, are utilized or (re-)used (reallocated) by the session supervisor 404.

For example, for this purpose, an actual current is transferred via the session update message 410 to the load management 401 by means of a parameter $I^{ACT}$. It is possible to determine on the basis of the parameter $I^{ACT}$ whether the electrical energy provided for an electric vehicle is being called up by this electric vehicle (or the charging station for this electric vehicle). If not all of the provided electric energy is called up, the remainder can be distributed among other charging stations, for example. It is thus possible to use unused resources efficiently and promptly and therefore to increase the efficiency of the charging operations.

The present current measured value of a session can be communicated from the charging station to the charge control device 407 and from there to the load management 401. Furthermore, it is possible for the charging station to set the current with which the electric vehicle is intended to be charged or to communicate to the electric vehicle a charge current which should not be exceeded. This current can be limited by the charge control device 407. The current presently provided to the charging station can thus be predetermined by the charge control device 407 to the load management 401 explicitly in absolute values and/or in the form of changes, for example in units of 0.5 A.

If the maximum of the communicated values for a predetermined time interval is below a predetermined maximum provided charging current $I^{TARGET}$, the measured maximum of the charging current (or alternatively a value derived therefrom, for example 110% of the maximum measured charging current) is used as a further limit for the session. Thereupon, a new load distribution is determined, in which the freely usable proportion of the charging current $$I^{\Delta} = I^{TARGET} - I^{ACT}$$

can be made available to other sessions.

In other words, the current $I^{\Delta}$ which is presently not being used by an electric vehicle or the associated charging station and can therefore be allocated to other charging operations (other sessions) is determined. In this case, the charging current $I^{ACT}$ can correspond to the maximum of the charging current measured over a predetermined number of time intervals. In addition, the charging current $I^{ACT}$ can contain a safety margin: thus, the charging current $I^{ACT}$ can be, for example, 110% of the maximum measured charging current. Thus, a slight fluctuation in the demanded charging current could be compensated for without a load redistribution of the resources (i.e. of the current) between the sessions being necessary.

The frequency of the redistributions can be limited to a (predetermined) degree by means of a parameter $\Delta^{MIN}$, for example:

if the difference between the setpoint value $I^{TARGET}$ and the maximum of the values communicated at times $t_1$, $t_2$, ..., $t_n$ is greater than the parameter i.e. $\Delta^{MIN}$, i.e.

$$I^{TARGET} - \text{MAX}\{I^{ACT}(t_1), I^{ACT}(t_2), \ldots, I^{ACT}(t_n)\} \geq \Delta^{MIN},$$

a redistribution is performed.

Since the charging current required by an electric vehicle via the charging station can vary over time, the limitation of the charging current can be cancelled again after a predetermined time period. Then, the maximum of the charging current can be redetermined and possibly another charging current can be provided to this electric vehicle. The predetermined time period can be specified, for example, by means of a parameter which specifies when predetermination of the charging current arises.

FIG. 5 shows three sessions 501 to 503, wherein each session relates to, for example, a charging operation for an electric vehicle. Illustrated for each session 501 to 503 are:

in each case one maximum charging current 504, 507 and 510;

in each case a demanded charging current 505, 508 and 511;

in each case an actual charging current 506, 509 and 512.

In the example shown, in total a charging current of 100 A is available, which is intended to be divided in a suitable manner between the sessions 501 to 503. The maximum charging current 504, 507 and 510 is 80 A for all sessions 501 to 503.

For example, up to a time 513, the demanded charging current 511 is reduced by the session 503 from 80 A to 50 A, and at a time 514, the demanded charging current 511 is increased from 50 A to 80 A again. This alternation between 80 A and 50 A continues for the demanded charging current 511 up to a time 520, at a time 521 the demanded charging current 511 is reduced to 35 A, at a time 522 the demanded charging current 511 is increased to 40 A and at a time 523 is reduced to 35 A again. The actual charging current 512 follows, by way of example, the demanded charging current 511.

The session 502 demands a charging current 508 of 50 A at time 513 and a charging current of 508 of 20 A at a time 514. This change continues over the times 515 to 520. At time 521, the demanded charging current 508 is increased to 35 A, reduced to 20 A at time 522 and increased again to 35 A at time 523.

Finally, the charging current 505 demanded by the session 501 at time 521 is 35 A, 40 A at time 522 and 35 A again at time 523.

The actual charging current 509 for the session 502 is continuously 20 A. The actual charging current 506 for the session 501 follows the demanded charging current. This ensures that, in total, no more than 100 A need to be provided.

FIG. 5 therefore shows, by way of example, that resources becoming free can be used for other sessions. Thus, from time 516 onwards, the charging current of the session 502 is reduced by 30 A. This charging current can be allocated to the session 503, which therefore receives a charging current of 80 A at time 516 (which otherwise could not be provided).

Change Management for the Load Management (Load Management Rollout)

A new load distribution is communicated to the change management 405 via the charge control device 407. If changes are implemented immediately, short-term peak loads can arise, which are undesirable for the electrical grid.

The invention therefore proposes implementing or setting the new load distribution in stepwise fashion. For example, a change to a predetermined charging current is not implemented for a plurality of sessions at once and/or is not implemented completely, but is implemented stepwise, for example, in the case of a reduction of the charging current, a predetermined time period is granted to the consumer (for example electric vehicle) to set the charging current to the reduced value.

By way of example, this predetermined time period can be set by the charging station, which is connected to the charge control device 407. If, once this predetermined time period has elapsed, the new reduced charging current is not reached, the charging station can be disconnected, for example (for a specific period, for example).

It is thus possible to effectively avoid undesired peak loads of the charging current by virtue of, for example, not all of the values of the new load distribution being communicated to the affected charging stations as new setpoint values at the same time. Instead, the values of the new load distribution are communicated to the charging stations with a time delay with respect to one another, for example.

FIG. 6 shows a schematic illustration with steps for illustrating the change management for the load management.

For example, in a step 601, values are transmitted only to the charging stations for which the new charging current has been reduced in comparison with the previous charging current.

In a step 602, it is possible for a check to be performed to ascertain whether the reduction in the charge current is maintained by the charging stations. This can be achieved by virtue of the actually drawn charging current (In which is provided by the session supervisor 404 being monitored.

Now, in a step 603, the change management 405 can check for the load management whether the present current measured value (presently drawn current) is less than or equal to the new setpoint value $I^{TARGET}$, i.e.

$$I^{ACT} \leq I^{TARGET}$$

In this case, the change in the charging current is considered to be met. Now, in a step 604, the charging current can be raised for the other charging stations. This ensures that a reduction precedes an increase, which effectively prevents peak loads.

Preferably, the stepwise matching of the charging currents corresponding to the new load distribution is performed in such a way that this is not interpreted by the load management method 402 as a cause for the determination of a changed load distribution (as long as the new load distribution has still not been completely implemented). This can be achieved, for example, by virtue of the fact that the conversion to the new load distribution is implemented much quicker than the cycles of the calculation of a load distribution by the load management method 402. Then, there is no prospect, or a negligible prospect, of the load management method 402 calculating a load distribution before the new load distribution has been implemented. One variant consists in that, prior to complete implementation of the new load distribution, the possibility of a load distribution being redetermined by the load management method 402 is ruled out by the change management 405. Provision can thus be made, for example, for a further load distribution to be calculated only when this is indicated by the change management 405, for example by means of a message to the session supervisor 404, the session management 403 and/or the load management method 402. For example, a flag can be active or inactive in the respective unit 404, 403 or 402, in this regard, which flag indicates that the present load distribution has not yet been implemented completely.

Parameterization

The parameterization 406 manages parameters for the load management 401. In particular, the parameterization 406 can set parameters for the load management method 402.

In addition, the parameterization 406 can ensure that parameters with a time dependency (for example for a given total load profile) are updated at the corresponding time.

Load Management Method

The text which follows explains how the load distribution can be determined. By way of example, as least a portion of this calculation can be implemented in the load management method 402.

An efficient and/or fair load distribution is thus achieved, wherein in particular various boundary conditions can be adhered to. As boundary conditions, at least one of the following provisos is taken into consideration, by way of example:

- each charging session can be assigned to one group or a plurality of groups by an ID (also referred to as identification), a charging device (for example a charging station) and, for example, on the basis of a type of agreement of a user or of a vehicle to be charged;
- a capacity, for example a charging capacity, can be predetermined or determined in another way for a group;
- a limitation of a charging current can be predetermined for a charging operation or for each charging operation;
- each charging operation can be supplied with a base charging current or a minimum charging current, for example;
- a weighting factor in respect of a prioritization of the charging operation can be determined for each charging operation.

A distribution substation has, for example, a large number of feeders to the low voltage grid with a large number of connection points via which, for example, a charging operation of a vehicle can take place by means of a charging station. A distribution substation is connected to an energy grid on the medium-voltage level via (at least) one transformer. The transformer provides a predetermined maximum charging capacity. This maximum charging capacity should be adhered to by the connection points. Furthermore, the energy grid can provide different types of current, for example a favorable current and an ecologically obtained current (referred to below as "ecological current"), via the transformer. The types of current can be linked with different prices. For example, a proviso of a customer may be that the charging operation should take place with ecological current to x % (x=0 . . . 100). This can be regulated by an agreement, for example, and correspondingly taken into consideration in the charging operation. It is also possible for this proviso to be treated as a wish and, if the wish cannot be met, to deviate from this wish with an alternative (in this case the favorable current, for example). To this extent, a customer can be assigned to a group, for example, which performs exclusively or preferably charging operations with ecological current (the type of agreement can be linked with the group assignment).

Figure 1:
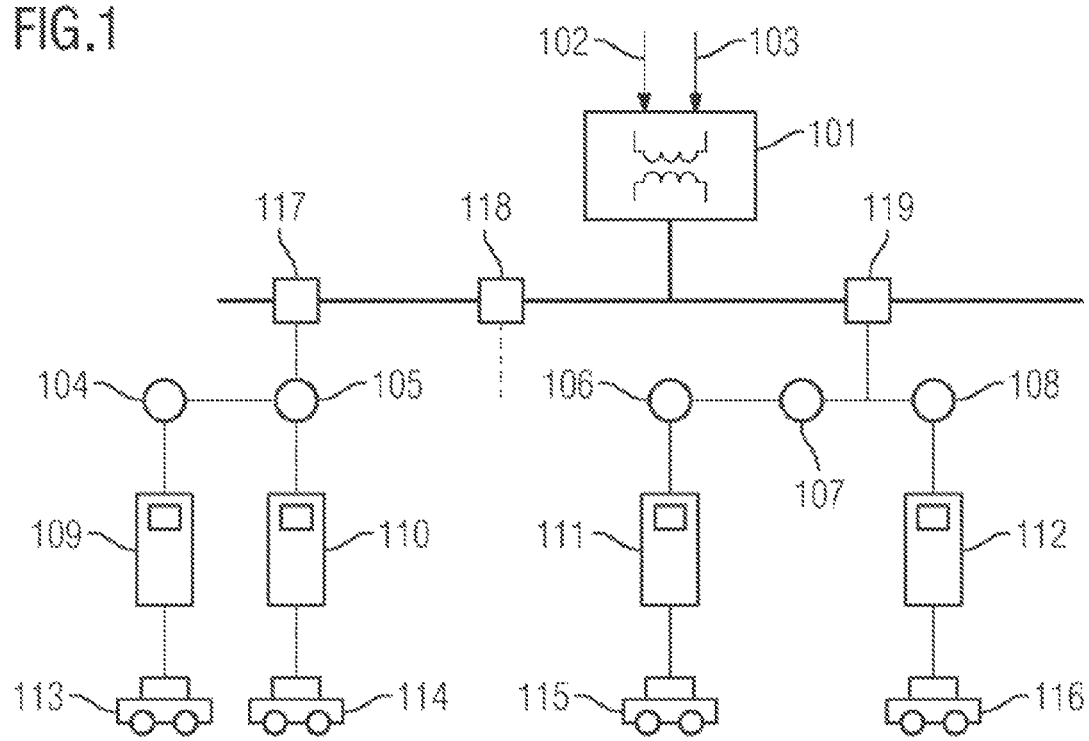
FIG. 1 shows a schematic diagram for charging electric vehicles via an energy grid.

FIG. 1 shows a transformer 101 which can be supplied with ecological current 102 and with favorable current 103 from an energy grid. The transformer 101 is, for example, part of a distribution substation.

The transformer 101 is connected to three feeders 117, 118 and 119 via a line. The feeder 117 is connected to a charging station 109 via a connection point 104, at which charging station an electric vehicle 113 is charged. The feeder 117 is furthermore connected to a charging station 110 via a connection point 105, at which charging station an electric vehicle 114 is charged. For example, in addition, the feeder 119 is connected to the connection points 106 to 108, wherein the connection point 106 is connected to a charging station 111 at which an electric vehicle 115 is charged, and wherein the connection point 108 is connected to a charging station 112 at which an electric vehicle 116 is charged.

For example, both the transformer 101 in the distribution substation and each of the feeders 117 to 119 provides a maximum capacity which should not be exceeded.

An identification (ID) is managed for each charging operation in a (central or decentralized) charging system. The charging operation for an electric vehicle also has a maximum permissible charging current $I^{MAX}$. This maximum permissible charging current results, for example, as a minimum of the variables limiting the charging operation: for example, the maximum charging current is limited by

- a maximum permissible charging capacity of the cable between the electric vehicle and the charging station,
- a maximum permissible charging capacity of the charging station,
- a maximum permissible charging capacity of the cable between the charging station and the feeder.

The lowest of the maximum permissible charging capacities (descriptively: the weakest link in the chain) is critical for the maximum permissible charging current $I^{MAX}$. Preferably, a (temporally limited) charging operation is assigned to precisely one agreement. The agreement indicates whether, for example, ecological current or favorable current should be used.

Combinations of types of currents are also possible. In addition, reference is made to the fact that, in the example, for reasons of clarity, a distinction is only drawn between two types of current. Correspondingly, many different types of current, for example from different providers, possibly with different prices, are possible. A contingent in relation to the maximum permissible charging capacity can be linked with an agreement.

The charging system can receive one profile per group and day, for example a large number of values can be provided or predetermined per unit time (for example 96 quarter-hour values per day).

An example will be illustrated below with reference to FIG. 1:

The electric vehicle 113 receives an identification ID1 for the charging operation, the electric vehicle 114 receives an identification ID2 for the charging operation, the electric vehicle 115 receives an identification ID3 for the charging operation, and the electric vehicle 116 receives an identification ID4 for the charging operation. The electric vehicles 113 and 115 with the identifications ID1 and ID3 are intended to be charged with ecological current 102, and electric vehicles 114 and 116 with identifications ID2 and ID4 are intended to be charged with favorable current 103.

Thus, by way of example, the following groups result:

Group $G_{ec}$, which is or is intended to be charged with ecological current:

$G_{ec} = \{1, 3\}$;

Group $G_{fav}$, which is or is intended to be charged with favorable current:

$G_{fav} = \{2, 4\}$;

Group $G_{feed1}$, which is or is intended to be charged at the feeder 117:

$G_{feed1} = \{1, 2\}$;

Group $G_{feed2}$, which is or is intended to be charged at the feeder 118:

$G_{feed2} = \{ \}$;

Group $G_{feed3}$, which is or is intended to be charged at the feeder 119:

$G_{feed3} = \{3, 4\}$;

Group $G_{trans}$, which is or is intended to be charged at the transformer:

$G_{trans} = \{1, 2, 3, 4\}$.

The identifications of the electric vehicles 113 to 116 affected for the respective group are contained in the curly brackets { ... }. Alternatively, it is likewise possible for the identifications ID1 to ID4 to be denoted as identifications for the charging operations.

Each group or a selection of groups has a capacity restriction $C_{group}$, for example.

By way of example, a central or else decentralized (see further below in this regard) charging system (also referred to as "load management") will be described below taking into consideration, for example, a corresponding load distribution. The load distribution is preferably performed taking into consideration predetermined secondary conditions. The charging system determines, for example, a parameter $I^{TARGET}$, which determines the maximum power consumption (current) per charging operation or charging station. The charging system can be operated, for example, in accordance with or on the basis of the standard IEC 61851.

By way of example, the charging system can comprise an interface, which provides the following functions (for example realized as function callups):
 energyRequest ( ): communication to the load management in respect of a further (new) charging operation;
 sessionEnd ( ): end of a charging operation;
 sessionUpdate ( ): updating of status values of a charging operation:
 energySet ( ): setting the parameter $I^{TARGET}$ as a setpoint value by the charging system.

Mention is made here to the fact that the charging operation can also be referred to as a session.

An exemplary approach will be explained below which enables, for example, efficient and fair distribution of the total capacity via the control of the parameter $I^{Target}$.

Fair Load Distribution of the Total Capacity

In this scenario, a total capacity C is predetermined. Furthermore, there is only one individual group and the number of charging operations n is known. The setpoint value $I^{Target}$ for the load distribution is:

$$I^{target} = \frac{C}{n}$$

The load distribution can be performed as follows:
(a) a charging station informs the (central) charging system of a status change, for example by means of the abovementioned functions energyRequest ( ), sessionEnd ( ), sessionUpdate ( ).
(b) In a subsequent step, the charging system determines for each status change a load distribution and communicates this to the charging station(s).

Fair Weighted Load Distribution

In this scenario, too, the total capacity C is predetermined; there is only one individual group and the number of charging operations n is known. For a charging operation s ∈ S, a weighting factor $w_s$ is defined for a prioritization. The load distribution can be determined in the form of a vector $$I^{Target}=(I_s^{Target}, s \in S)$$

The setpoint value of the load distribution $I_s^{Target}$ per charging operation results as follows:

$$I_s^{Target} = \frac{\omega_s \cdot C}{\sum_{s \in S} \omega_s}$$

$$\forall s \in S$$

The load distribution is performed analogously to the steps in the above-explained scenario "fair load distribution of the total capacity".

Example: With a total capacity C=100 and n=10 charging operations and a weighting of the 10 charging operations in accordance with the following vector w, the load distribution vector $I^{Target}$ follows from this:

$$w = \begin{bmatrix} 3 \\ 1 \\ 3 \\ 2 \\ 3 \\ 2 \\ 3 \\ 2 \\ 1 \\ 1 \end{bmatrix} \Rightarrow I^{Target} = \begin{bmatrix} 14,2857 \\ 4,7619 \\ 14,2857 \\ 9,5238 \\ 14,2857 \\ 9,5238 \\ 14,2857 \\ 9,5238 \\ 4,7619 \\ 4,7619 \end{bmatrix}$$

Fair Load Distribution with Two Secondary Conditions

In this scenario, too, the total capacity C is predetermined; there is only a single group and the number of charging operations n is known. The charging current can be limited for each charging operation s individually to a maximum charging current $I^{MAX}$:

$$I^{MAX}=(I_s^{MAX}, s \in S)$$

The load distribution can be performed, for example, by means of a so-called "Max-Min Flow Control" method (cf.: D. Bertsekas, R. Gallager: "Data Networks", $2^{nd}$ Edition, Prentice-Hall, 1992, pages 527, 528).

Example: With a total capacity C=100 and n=10 charging operations and a limitation of the charging current per charging operation, a load distribution vector $I^{Target}$ results from this:

$$I^{MAX} = \begin{bmatrix} 6 \\ 6 \\ 2 \\ 2 \\ 17 \\ 5 \\ 22 \\ 5 \\ 5 \\ 25 \end{bmatrix} \Rightarrow I^{Target} = \begin{bmatrix} 6 \\ 6 \\ 2 \\ 2 \\ 17 \\ 5 \\ 22 \\ 5 \\ 5 \\ 25 \end{bmatrix}$$

Fair Weighted and Proportional Load Distribution

Each charging operation can be assigned to different groups by an identification of the charging station and by a type of agreement. A maximum capacity $C_{GroupID}$ can be defined for each group. The charging current can be limited for each charging operation in accordance with the relationship $$I^{MAX}=(I_s^{MAX}, s \in S)$$

Furthermore, it is possible to determine that each charging station receives at least one base current $I^{base}$. A weighting factor $w_s$ for a prioritization is defined for a charging operation s ∈ S.

Therefore, the following maximization problem results:

$$\max \Sigma_{s \in S} \omega_s \log(I_s^{Target})$$

with the secondary conditions:

$$R \cdot I^{Target} < C,$$

$$I^{Target} \geq I^{Base},$$

wherein R represents a matrix with the charging operations and the capacity limitations thereof, C represents a vector with all capacity limitations, and $I^{Target}$ represents the load distribution vector.

Instead of the logarithm function, any desired concave function can be used.

Example: On the basis of the example shown in FIG. 1, six further charging operations are added to the four charging operations illustrated. In total, there are thus n=10 charging operations. In addition, the following maximum capacities are predetermined:

for the ecological current: $C_{ec}=45$;
for the favorable current: $C_{fav}=200$;
for the transformer: $C_{Trans}=100$;
for the feeder 117: $C_{feed1}=40$;
for the feeder 118: $C_{feed2}=100$;
for the feeder 119: $C_{feed3}=100$;

The following maximum charging currents are predetermined for the charging operations 1 to 10:

$$I^{MAX} = \begin{bmatrix} 100 \\ 10 \\ 10 \\ 100 \\ 10 \\ 10 \\ 100 \\ 100 \\ 10 \\ 10 \end{bmatrix}$$

$I^{base}=6$ is predetermined as the minimum current per charging operation.

This results in the following matrix R:

$$R = \begin{bmatrix} \text{Unit matrix, Dimension } n \\ R_{feed1} \\ R_{feed2} \\ R_{feed3} \\ R_{trans} \\ R_{ec} \\ R_{fav} \end{bmatrix}$$

$$= \begin{bmatrix} 1 & 0 & 0 & 0 & 0 & 0 & 0 & 0 & 0 & 0 \\ 0 & 1 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \\ 1 & 1 & 1 & 1 & 1 & 0 & 0 & 0 & 0 & 0 \\ 0 & 0 & 0 & 0 & 0 & 0 & 0 & 0 & 0 & 0 \\ 0 & 0 & 0 & 0 & 0 & 1 & 1 & 1 & 1 & 1 \\ 1 & 1 & 1 & 1 & 1 & 1 & 1 & 1 & 1 & 1 \\ 1 & 0 & 1 & 0 & 1 & 0 & 1 & 0 & 1 & 0 \\ 0 & 1 & 0 & 1 & 0 & 1 & 0 & 1 & 0 & 1 \end{bmatrix}$$

wherein the columns in the matrix R identify the charging operations 1 to 10. The vector $R_{feed1}$ indicates that the charging operations 1 to 5 are supplied form the feeder 117, the vector $R_{feed3}$ indicates that the charging operations 6 to 10 are supplied from the feeder 119. The feeder 118 in this example does not supply a charging operation. The vector $R_{trans}$ indicates that the transformer 101 supplies all charging operations 1 to 10. the vector $R_{ec}$ indicates that the charging operations 1, 3, 5, 7 and 9 are implemented with ecological current, and the vector $R_{fav}$ indicates that the charging operations 2, 4, 6, 8 and 10 are implemented with favorable current.

The vector C results as follows:

$$C^T = \begin{bmatrix} I^{MAX} \\ C_{feed1} \\ C_{feed2} \\ C_{feed3} \\ C_{trans} \\ C_{ec} \\ C_{fav} \end{bmatrix} = \begin{bmatrix} 100 \\ 10 \\ 10 \\ 100 \\ 10 \\ 10 \\ 100 \\ 100 \\ 10 \\ 10 \\ 40 \\ 100 \\ 100 \\ 100 \\ 45 \\ 200 \end{bmatrix}$$

This results in the following for the load distribution vector:

$$I^{Target} = \begin{bmatrix} 7,4424 \\ 8,8365 \\ 7,4424 \\ 8,5365 \\ 7,4424 \\ 10,0000 \\ 12,6720 \\ 17,5271 \\ 10,0000 \\ 10,0000 \end{bmatrix}$$

In this example, the limiting secondary conditions are the maximum permissible currents for the charging operations 6, 9 and 10, the maximum permissible capacity of the feeder 117 ($C_{feed1}=40$), the maximum permissible capacity of the transformer 101 ($C_{trans}=100$) and the maximum permissible (or possible) ecological current ($C_{ec}=45$).

In addition, it is also possible for the individual charging operations to additionally obtain prioritization by means of the weighting factor $w_s$. This prioritization can be taken into consideration, in addition to the abovementioned specifications, in the determination of the load distribution vector:

$$w = \begin{bmatrix} 1 \\ 2 \\ 3 \\ 4 \\ 5 \\ 6 \\ 7 \\ 8 \\ 9 \\ 10 \end{bmatrix} \Rightarrow I^{Target} = \begin{bmatrix} 6,0000 \\ 6,0000 \\ 6,0000 \\ 9,6675 \\ 9,5828 \\ 10,0000 \\ 13,4176 \\ 19,3325 \\ 10,0000 \\ 10,0000 \end{bmatrix}$$

One advantage of the approach proposed here consists in that a maximum charging current for a plurality of charging operations, for example for a plurality of charging stations and/or electric vehicles, can be coordinated centrally or in decentralized fashion whilst adhering to predetermined secondary conditions which can be adjusted in a versatile manner. The secondary conditions can be economic specifications and/or technical specifications.

Example: Decentralized Load Management

The decentralized load management can be performed in various ways. Two possibilities will be explained below by way of example.

(1) Master Selection:

In this case, the charging stations or the charging operations which are functions capable of running in a component, for example, select a master which determines the load distribution. Then, it is assumed by way of example that a plurality of charging stations act as peers (communicating components or functions) and organize themselves. This approach is likewise possible for functions (for example charging operations) which are capable of running on one or more components.

If the master fails, this is identified by the other charging stations and a new master is determined. This approach has the advantage that the load management does not need to be adapted for the decentralized approach, but can be transferred from the central load management without any changes. The complexity which results from a decentralized implementation is outside the load management component and can be provided by other components.

(2) Communication Without a Master (Also Referred to as "Gossiping Method"):

In this case, coordination is performed without a central instance. The charging stations form a peer-to-peer (P2P) network and communicate with other charging stations (Peers) which are selected, for example, at random (or pseudo-randomly) or in accordance with a predetermined scheme.

In this case, different estimated values can be determined, for example relating to the present total consumption in the P2P network. On the basis of these estimated values, a load management component of the charging station decides autonomously on the charging current $I^{Target}$ to be predetermined. In the gossiping method, the load management is implemented in distributed fashion (for example by means of a distributed algorithm). This step needs to be reimplemented for each algorithm.

The gossiping method is suitable for large networks in which a central processing is too complex or the coordination of a central processing alone would result in a high traffic load.

Approach (1) "master selection" will be described in more detail below. Primarily for a small number of charging stations (for example approximately 32), the processing complexity for the master is uncritical and does not impair the performance of the components.

It is advantageous here that a deterministic load management can be achieved in which there are no fluctuations resulting from a convergence response.

Example of a Decentralized Load Management with "Master Selection".

Figure 2:
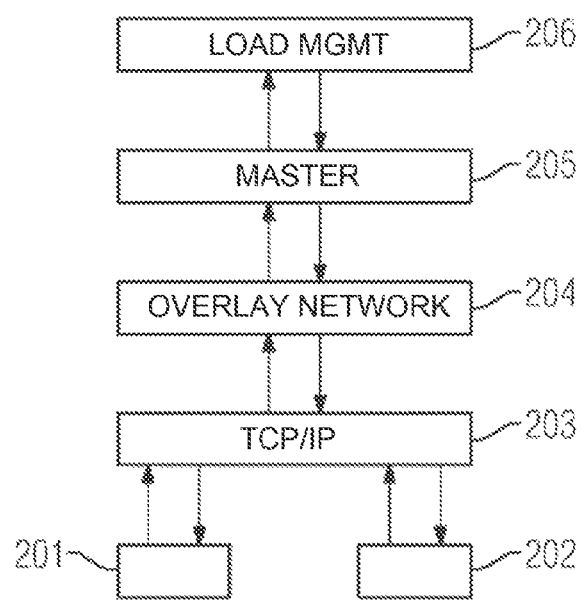
FIG. 2 shows schematic architecture of a decentralized load management which enables or supports the approach of "master selection"

FIG. 2 shows, by way of example, an architecture of a decentralized load management which enables or supports the "master selection" approach.

Preferably, a program is used in the charging stations which follows the decentralized approach described here. For example, one and the same program can run on a plurality of charging stations since each charging station (as a node of a P2P network) is thus capable of performing the function of the master.

The program can use different communication paths, for example wireless or wired communications. For example, the charging stations can communicate with one another over the Ethernet 201 and/or over a mobile radio network 202 (for example GSM, UMTS, LTE, etc.) by means of TCP/IP 203.

An overlay network 204 is illustrated above the TCP/IP layer 203 in the protocol architecture in FIG. 2, which overlay network manages the logic network above the IP network.

In a P2P network, a large number of peers (in this case in the example: charging stations) with significant dynamics (changes over time) can be provided. The overlay network 204 can be structured by means of distributed hash tables. In the example described here, management of the overlay network 204 can be supported in a configuration phase (also referred to as engineering phase or parameterization) by a central component, i.e. each peer (charging station) of the P2P network receives a complete list of all peers (charging stations) during its configuration.

On the basis of the list of all of the peers, the selection of the master 205 is performed in each of the charging stations. In a first step, it is assumed that the lists of peers are consistent. In the case of inconsistent peer lists, said lists are synchronized. The master is selected on the basis of a peer ID assigned by the central instance. For example, that charging station which has the smallest peer ID is selected as master.

If a charging station has determined itself as master, it activates a master mode and initializes a load management 206, for example by activation of a load management algorithm. The parameters required for this can be fixed by the central component and can correspond to the parameters of the central load management.

The master actuates, for example, the same interface callups as in the central case, for example:
  energyRequest ( ) for new requests,
  sessionEnd ( ) for ending a charging operation,
  sessionUpdate ( ) for the updating of status values,
  energySet ( ) for setting the setpoint value of a charging station.

For the interface callups, for example, corresponding XML messages can be defined and used for the decentralized case.

Figure 3:
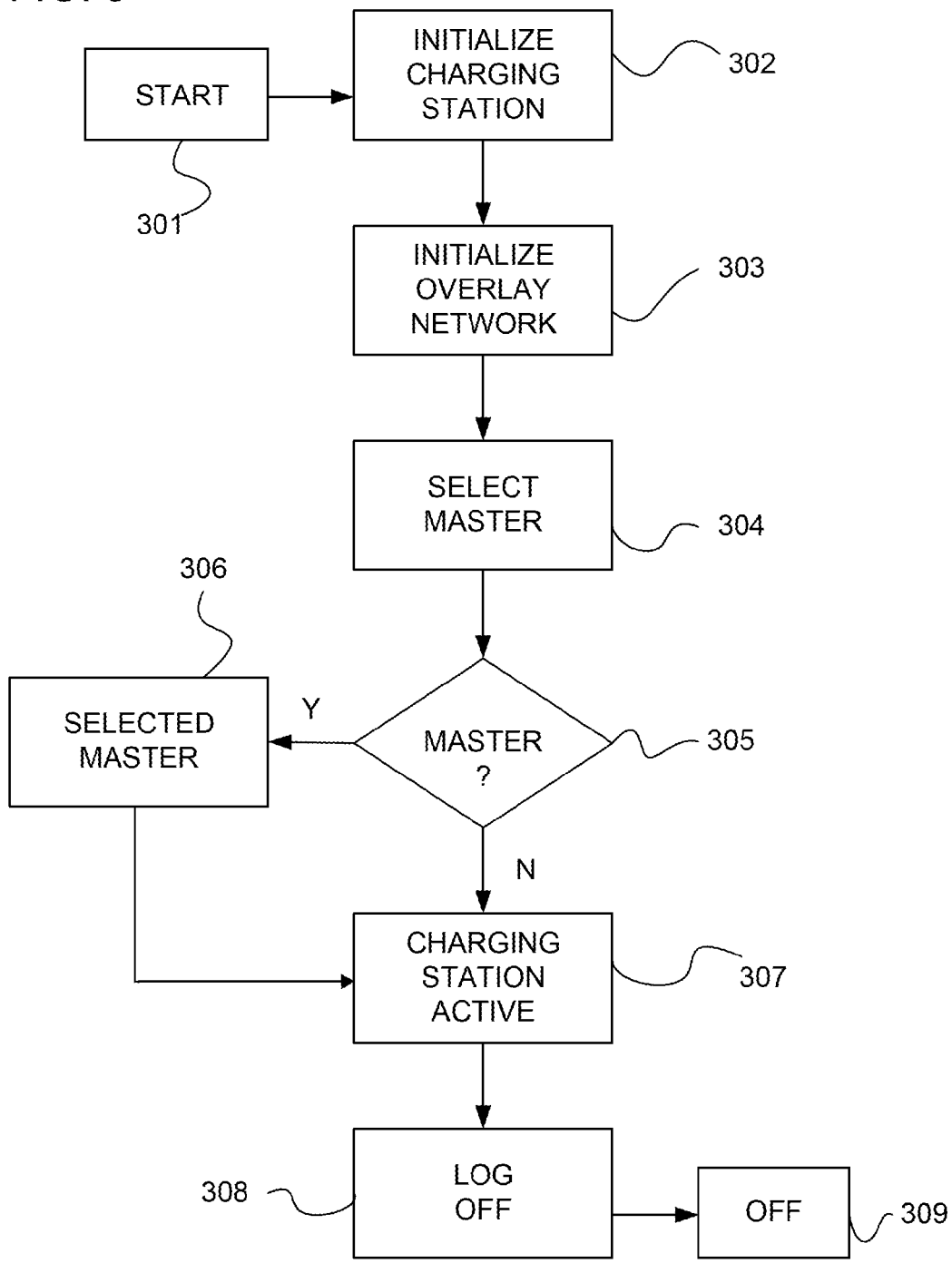
FIG. 3 shows an exemplary state diagram for a charging station.

FIG. 3 shows an exemplary state diagram for a charging station. First there is a transfer from an initial state 301 to a state 302 for initializing the charging station. In a subsequent state 303, the overlay network is initialized and the master selection is performed in a subsequent state 304. If the master has been selected, the system branches off to an enquiry 305. If the present charging station has selected itself as master, the system branches off to a state 306, and initialization (or conversion) of the present charging station as master takes place. Subsequently or when the enquiry 305 determines that the present charging station has not been selected as master, the system branches to a state 307, in which the charging station is active (as master or as normal peer). A termination induces a change into a state 308, in which the charging station logs off and transfers to a final state 309 (for example for shutdown or maintenance of the charging station).

The decentralized load management can be initially parameterized. Before a charging station becomes active in a decentralized load management a link is set up to the central component. For example, a fitter can implement the parameterization of the charging station once the charging station has been set up via a laptop by means of the central component.

For example, a charging station can log on with the central component and receives the peer list of the available charging stations. The fitter can now set necessary parameters (set or update). This type of parameterization is comparable with the scenario of the central load management. Groups with capacity restrictions can also be set, and charging stations can be assigned to groups (included in groups or deleted from groups). Once the information has been input, the charging station is set by virtue of, for example, all of the parameters for the setting being summarized in one file and transmitted to the charging station.

Resolving Faults

Fault cases are listed below by way of example and in each case a corresponding way of resolving the fault is proposed.

(a) Failure of the Master
  A failure of the master is a critical fault, and a corresponding way of resolving this fault is necessary for continued function in a decentralized scenario since, without the master, the load distribution is impossible.
  In the event of failure of the master, the function of the master should be taken on by another charging station. Preferably, the following steps are implemented for this purpose:
  (i) selection of a backup master and redundant storage of the load distribution prior to the failure of the master;
  (ii) identification of the failure of the master;
  (iii) selection of a new master from among the requesting charging stations.
  In order not to lose a present load distribution as a result of the failure of the master, this present load distribution is stored, for example, in the case of a backup master to be determined in advance. The backup master can be determined on the basis of its peer ID (for example the second lowest peer ID is used for the backup master).
  This approach can be used analogously for a plurality of backup masters: in order to be able to accommodate a plurality of failures of masters, a list with a large number of backup masters can be used, wherein a master passes on each message from a charging station to the backup masters as well. It is thus possible to ensure that the state in the master is also replicated in the backup masters.
  In this case it is an option for only the messages and not the complete load distribution information to be passed on. This complete load distribution information can be determined by the backup masters on the basis of the transmitted information itself.
  Failure of the master can be detected by the first unanswered request of a charging station. Thereupon, the requesting charging station makes contact with the (first) backup master and transmits the unanswered request to said backup master. The backup master requests a so-called "heartbeat" message from the master (i.e. information which indicates that the master is still active and can communicate). If the backup master receives the "heartbeat" message from the master, the request from the charging station is not processed, but is referred to the actual master (this can also take place by virtue of the backup master not undertaking anything because the backup master assumes that the master will answer the request of the charging station). If the backup master also cannot reach the master (i.e. in the case of a missing "heartbeat" message), it is assumed that the master has failed and the backup master activates its master mode and processes the request of the charging station. A further charging station whose request remains unanswered by the original master contacts the new master (formerly: backup master), which directly processes the request of the charging station.
  Preferably, in order to initialize the backup master as the new master, the complete state for the load management (list with load distributions) can be transmitted to said backup master.
  As an alternative to the redundant storage, in order to initialize the backup master as the new master, the complete state for the load management (list with load distributions) can be transmitted to said backup master or said backup master can contact all of the other charging stations and request their status.

(b) Failure of a Charging Station
  If a charging station which is not the master fails, it is possible to distinguish between two situations:
  (i) the failing charging station did not have an active charging operation;
  (ii) the failing charging station was in an active charging operation.
  In the first case (i), the failure does not have any effects on the load management and can therefore remain unresolved.
  In the second case (ii), the failure of the charging station could have effects on the load management and could therefore require monitoring of charging stations.
  It is also possible for the failure of the charging station to have a cause which cannot be distinguished by monitoring: for example, it is not possible to distinguish whether there is merely a communication problem or whether the charging station has failed. If only the communication to the charging station has failed, the charging station could implement a charging operation unchanged. In this case, the resources allocated to this charging station cannot be redistributed.
  One option consists in not implementing any monitoring of the charging stations, in particular if redistribution of the resources is intended to remain unchanged. Thus, it is possible for a fault to remain unresolved for the failure of a charging station depending on the application case.

(c) Reentry of a Previous Master
  If a former master becomes active again once it has failed, it is preferably necessary to ensure that no conflicts and/or inconsistencies occur.

For example, one possibility consists in assuming that a failure of the master is an indication of further failures. In this way, provision could be made for the previous master not to resume its master role. In order to ensure this, the peer ID of the former master can be changed. For example, the peer ID can be extended by a version number, wherein, for example, the version number is added as a prefix to the peer ID. The selecting of the master continues to be based on the lowest peer ID taking into consideration this prefix.

For other charging stations, the former master is either flagged as inactive or, in the event of a renewed request, this former master responds with updating of its peer ID (comprising the new version number). Therefore, it is possible to determine for the requesting charging station that the former master is no longer the present master.

(d) Inconsistent Peer Lists

In order to be able to determine the master unambiguously via all of the charging stations, the above-mentioned peer list is used. Correspondingly, this peer list needs to be kept consistent.

Preferably, the number of charging stations (for example within a cluster) can be small (comprising, for example, approximately 32 charging stations). Each charging station stores the peer list with the peer IDs of all of the other charging stations. The peer list can be parameterized by the central component.

If a charging station is added retrospectively, the peer list is parameterized on the basis of the central component. The new charging station receives the updated peer list and identifies all of the charging stations in the network, but the charging stations, initially, do not know this new charging station. Preferably, synchronization of the peer list with the charging stations is necessary. Such a synchronization can be implemented in a variety of ways.

For example, provision can be made for the new charging station to initially not be an option as a master; this can be ensured, for example, by increasing peer IDs, wherein the new charging station receives the previously highest peer ID and thus will at present hardly be selected as the master.

In order to synchronize the peer lists, the new charging station logs on with all other charging stations (for example by means of a join message). On the basis of this logon, the peer list can be updated for each charging station; the receiver supplements its peer list with the peer ID and the IP address of the new charging station.

Although the invention has been illustrated and described in more detail by the at least one exemplary embodiment shown, the invention is not restricted to this exemplary embodiment and other variations can be derived from this by a person skilled in the art without departing from the scope of protection of the invention.

The invention claimed is:

1. An apparatus for providing electrical energy, the apparatus comprising:
a processing unit configured to set a distribution for a plurality of sessions by a temporally graduated allocation of the electrical energy during the sessions, wherein the sessions are charging operations for a plurality of electrical consumers, the electrical energy is charging current provided to the electrical consumers or a power consumption of the electrical consumers during the charging operation, and the distribution sets the charging current or the power consumption during the charging operation;
said processing unit being further configured to allocate temporally graduated electrical energies for the plurality of sessions, and to set the distribution for the plurality of sessions by:
first setting the sessions with a reduced electrical energy;
checking whether the reduced electrical energy has been successfully set or reached; and
subsequently setting the sessions with an increased electrical energy.

2. The apparatus according to claim 1, wherein said processing unit is configured to enable a proportion of the electrical energy provided for the session that has not been called up to be provided to at least one other session.

3. The apparatus according to claim 1, wherein the electrical consumer is an electric vehicle, and said processing unit is disposed at least partially in a charging station of the electric vehicle.

4. A method of providing electrical energy to a plurality of electrical consumers, the method which comprises:
during charging operations for a plurality of electrical consumers, wherein the plurality of electrical consumers are provided electrical energy in the form of charging current or a power consumption of the electrical consumer during the charging operation:
setting a distribution for a plurality of sessions by a temporally graduated allocation of the electrical energy during each session, the distribution setting the charging current or the power consumption during the charging operation;
allocating temporally graduated electrical energies for the plurality of sessions, and setting the distribution for a plurality of sessions by:
first setting the sessions with a reduced electrical energy;
checking whether the reduced electrical energy has been successfully set or reached; and
subsequently setting the sessions with an increased electrical energy.

5. The method according to claim 4, wherein the allocation of the electrical energy comprises a plurality of steps, with a predetermined time period between the steps.

6. The method according to claim 5, which comprises reducing or disconnecting the electrical energy if, after the predetermined time period has elapsed, the allocated electrical energy has not been set.

7. The method according to claim 5, wherein the predetermined time period is a constant time period or a variable time period.

8. The method according to claim 4, which comprises setting the sessions with the increased electrical energy if electrical energy drawn at that time is less than or equal to a setpoint value for the electrical energy.

9. The method according to claim 4, which comprises providing at least a proportion of an electrical energy that has been readied for a given session, but that has not been called up, to at least one other session.

10. The method according to claim 9, which comprises providing the electrical energy that has not been called up by the given session completely or substantially completely to the at least one other session.

11. The method according to claim 9, which comprises providing a proportion of the electrical energy that has not been called up by the given session to the at least one other session.

12. The method according to claim 9, wherein the electrical energy provided to the session is dependent on a type of session.

13. The method according to claim 9, which comprises providing at least the proportion of the electrical energy provided for the given session that has not been called up to the at least one other session if at least the proportion of the electrical energy not called up reaches or exceeds a predetermined threshold value.

14. The method according to claim 13, which comprises providing at least the proportion of the electrical energy provided for the given session that has not been called up to the at least one other session if a maximum of the proportion of the electrical energy not called up and intended for different times reaches or exceeds the predetermined threshold value.

15. The method according to claim 9, which comprises providing at least the proportion of the electrical energy provided for the given session that has not been called up to the at least one other session for a predetermined time period.

16. The method according to claim 15, which comprises:
once the predetermined time period has elapsed, determining the electrical energy required by the session;
if the electrical energy provided to the session is not called up, providing at least a proportion of the provided electrical energy to the at least one other session.

17. The method according to claim 4, wherein the electrical energy is the charging current for the electrical consumer.

18. The method according to claim 4, wherein the electrical consumer is an electric vehicle.

19. The method according to claim 4, wherein the session comprises a charging operation for an electric vehicle.

* * * * *